Patented July 19, 1932

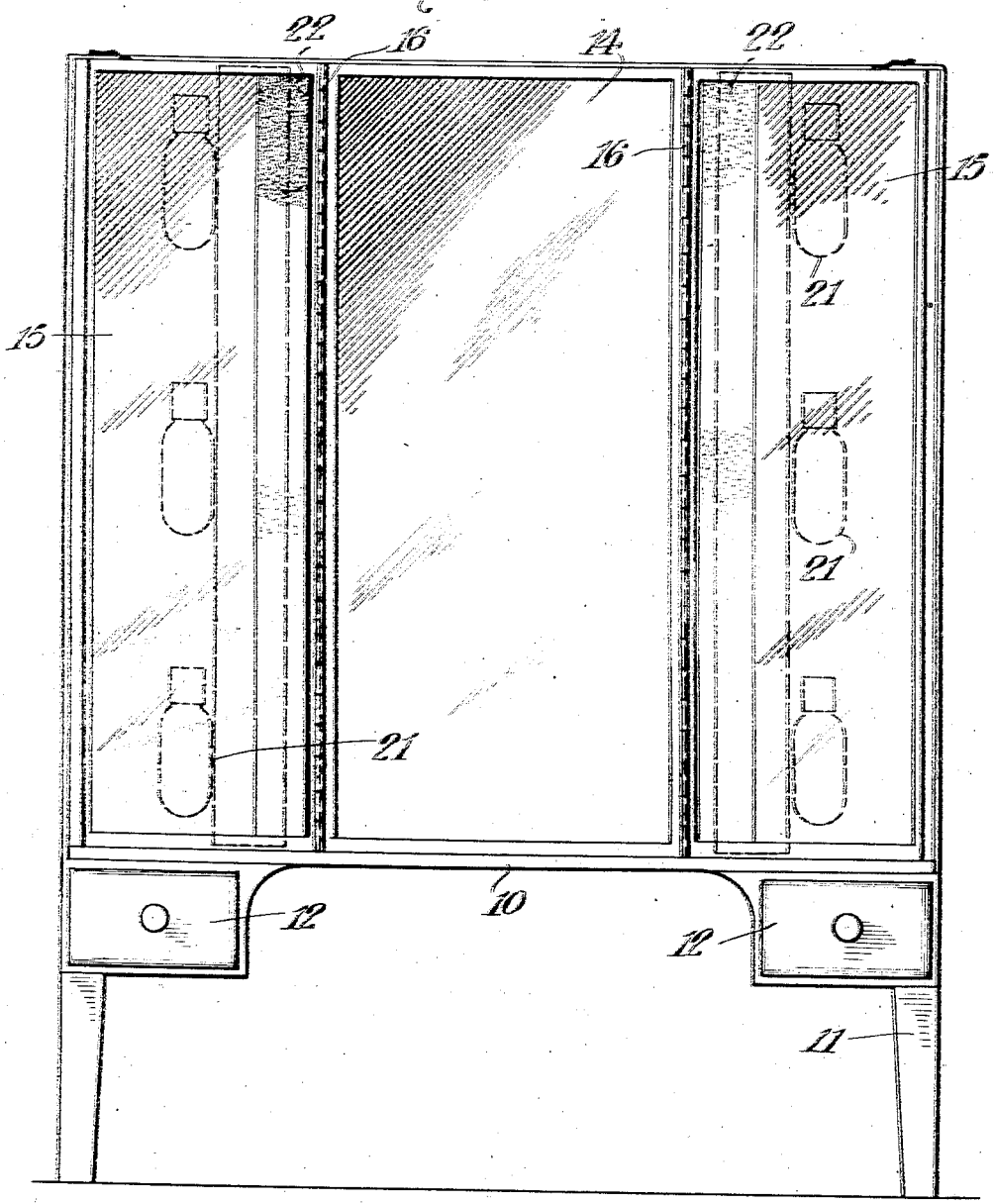

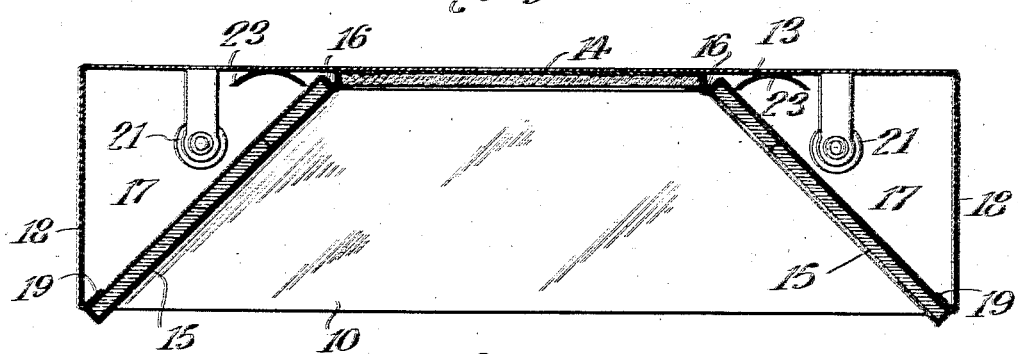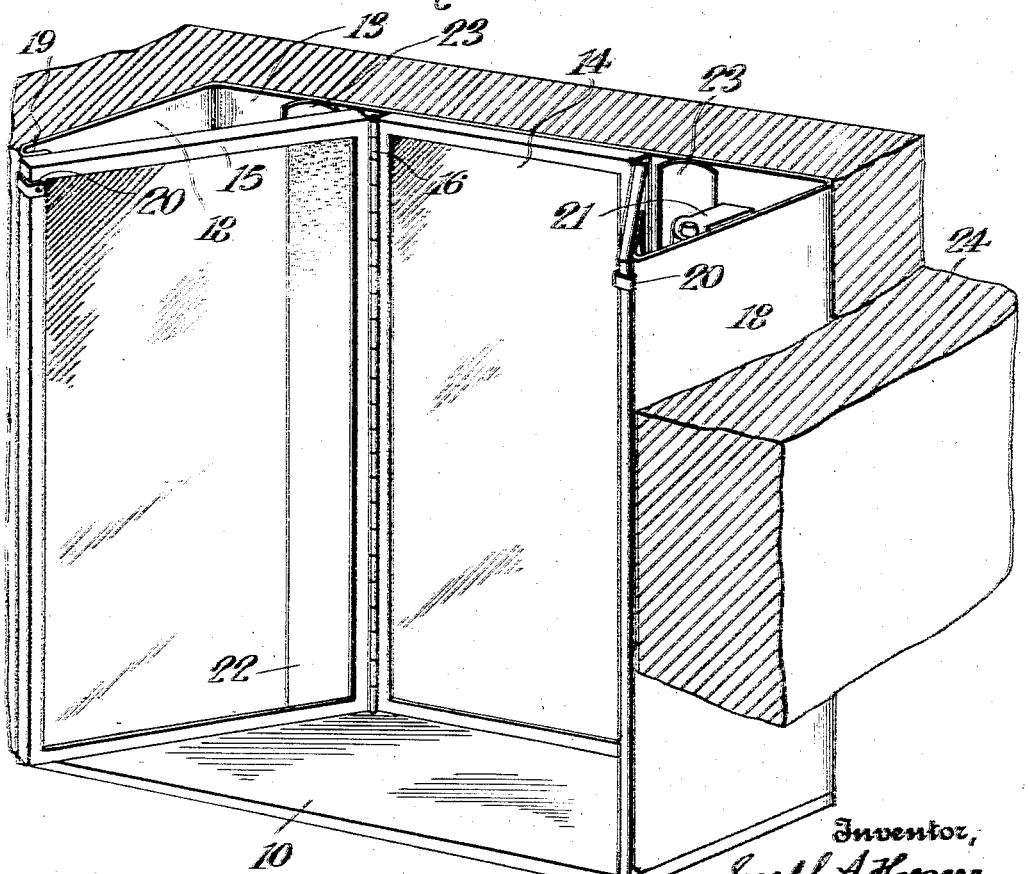

1,868,104

UNITED STATES PATENT OFFICE

JOSEPH A. HOEGGER, OF JERSEY CITY, NEW JERSEY

MIRROR DRESSER

Application filed April 8, 1929. Serial No. 353,387.

My invention relates to improvements in mirror dressers and the object of my invention is to produce a particularly handsome and convenient structure of this kind which can be conveniently used either as a dresser or in the nature of a cabinet setting in a recess of a wall. The invention is especially intended to produce a structure having a series of mirrors arranged to produce excellent refraction and disposed so as to add a real embellishment to the room in which the article may be.

The invention includes an arrangement of mirrors in which a horizontal base mirror may serve as a dresser top, a main mirror rises behind it, and perpendicular to it, wing mirrors are arranged at the sides of the last mentioned upright mirror and perpendicular to the base mirror, while lights can be disposed behind the wing mirrors and arranged to throw light upon the person or thing to be reflected by the mirrors as a whole.

The organization and construction of the article as a whole is such that it may stand on legs or be disposed in a wall recess, and in any event it forms a very handsome and convenient article of furniture.

Reference is to be had to the accompanying drawings forming a part of this specification in which similar reference characters indicate corresponding parts in all the views.

Figure 1 is a front elevation of the structure embodying my invention;

Figure 2 is a cross section thereof; and

Figure 3 is a perspective view partly in section showing the adaptation of the structure to a wall.

The invention includes a mirror 10 which serves as a dresser top and also as a base mirror. This can be supported on legs 11 carrying drawers 12 or the like, but the arrangement and construction of the parts beneath the mirror 10 are not important as these parts may be of any approved design and the structure above the mirror 10 can be used without legs and placed in a wall if desired as presently described. A plate 13 of any suitable material furnishes the back frame work of the construction and against this the mirror 14 lies, this mirror being the main mirror and rising from the back part of the base mirror 10 and being preferably perpendicular to said base mirror.

At the side edges of the main mirror 14 are wing mirrors 15, the arrangement of which, so far as the main mirror is concerned, is not novel, but the arrangement and disposition with respect to the combination of the base and main mirrors, and to the lighting effects behind them, is believed to be new.

These wing mirrors 15 are hinged as shown at 16 to the side edges of the mirror 14 and they are therefore perpendicular to the base mirror 10 and extend obliquely forward with respect to the mirror 14. Behind each of them is a chamber 17 which is usually of a generally triangular shape. This is formed by the sides 18 of the casing of the structure which comprises the back 13 already referred to and the forwardly extending projections 18 which make a box-like structure open in front. The forward edges of the sides 18 are preferably inturned as at 19 so that the backs of the free edge portions of the mirrors 15 lie against these abutments thus formed. Any suitable catches 20 can be used to hold the wing mirrors against the walls 18.

Within the chamber 17 are lights or lamps 21 which are preferably electric lamps and any suitable kind can be used. They can be conveniently supported on the back 13 of the chambers 17 and they are disposed so as to throw the light through the frosted parts 22 of the wing mirrors 15. This effect can be heightened by using reflectors 23 arranged vertically within the chambers and at such an angle as to throw the light rays forwardly through the parts 22 of the wing mirrors in a way to illuminate the person or object to be reflected, but so as not to throw the light upon the main mirror 14. I have referred to these parts 22 as frosted as this is the most common way of making the glass so that the light rays will permeate it but will not throw a glaring or blinding light. Obviously the glass can be treated in any other way to make it permeable to light, and the light-permeable parts and the lamps behind can obviously be disposed in other ways without affecting the invention. It will be understood too that the main portions of the wing mirrors 15 are opaque as usual, and all the mirrors 10, 14 and 15 can be of any usual or preferred construction so far as their reflecting properties are concerned.

If desired, the construction as a whole can be placed in a wall recess, after the manner of a wall cabinet, shown in Figure 3, in which case the under construction, that is the parts below the mirror 10, can be dispensed with, if desired, and the wall 24 finished out flush with the front edge portions of the casing of the device. The tops of the chambers 17 can be closed in a way suitable for closure.

Thus it will be seen that I produce a simple structure which is suited to effect a perfect reflection at various angles and it will be seen also that the wing mirrors 15 are capable of adjustment to get the desired effect, although the main purpose of having them hingedly connected with the mirror 14 is to permit ready access to the lamps 21 in the chambers 17.

I claim:

1. As an improved article of manufacture, a dresser having a fixed base mirror, a main mirror rising from the rear portion of the base mirror and substantially perpendicular thereto, wing mirrors hingedly connected to the main mirror and perpendicular to the base mirror said wing mirrors having light passages therethrough, and lighting means behind the wing mirrors.

2. As an improved article of manufacture, a mirror dresser comprising a box-like casing having a fixed horizontal base mirror, a main mirror rising from the rear portion of the base mirror, and wing mirrors extending from the edges of the main mirror to points adjacent the side edges of the casing thereby providing concealed spaces for illuminating means.

3. A mirror dresser comprising a box-like casing open in front, a fixed horizontal base mirror in the casing, a main mirror rising from the back part of the base mirror, wing mirrors extending from the sides of the main mirror to points adjacent the front side edges of the casing thereby forming corner chambers behind them, said wing mirrors having light passages therethrough, and lighting means disposed in the corner portions of the casing behind the wing mirrors.

4. A structure of the kind described comprising a box-like casing open in front, a horizontal base mirror in the casing, a main mirror rising from the back part of the base mirror, wing mirrors having light passages therethrough hingedly connected to the side edges of the main mirror and extending to points near the front side edges of the casing thereby forming chambers behind them, and lamps and reflectors disposed behind the wing mirrors.

5. A mirror dresser comprising a box-like casing open in front, a fixed mirror in the central part of the casing, wing mirrors hinged to the side edges of the main mirror and extending obliquely forward to points adjacent the sides of the casing, said mirrors having light passages therethrough, and lighting means in the corner portions of the casing behind the aforesaid wing mirrors.

6. A mirror dresser comprising a box-like casing open in front, a main vertical mirror on the back of the casing, wing mirrors having frosted portions permeable to light rays extending from the edges of the main mirror forwardly and laterally to the sides of the casing thereby forming chambers behind them, and lamps behind the wing mirrors.

7. A mirror dresser having an all mirror front and comprising a box-like casing, a horizontal mirror in said casing functioning as a table top, a main back mirror rising from the horizontal mirror and in fixed relation thereto, and side mirrors perpendicular to the horizontal mirror extending from the main mirror to the front side portions of the casing thereby concealing the inner corner portions of said casing.

In testimony whereof, I have signed my name to this specification this 5th day of April, 1929.

JOSEPH A. HOEGGER.